9845X
Sheet 1-2 Sheets.
E. Smith.
Domestic Oven.
Patented Jul. 1, 1836.
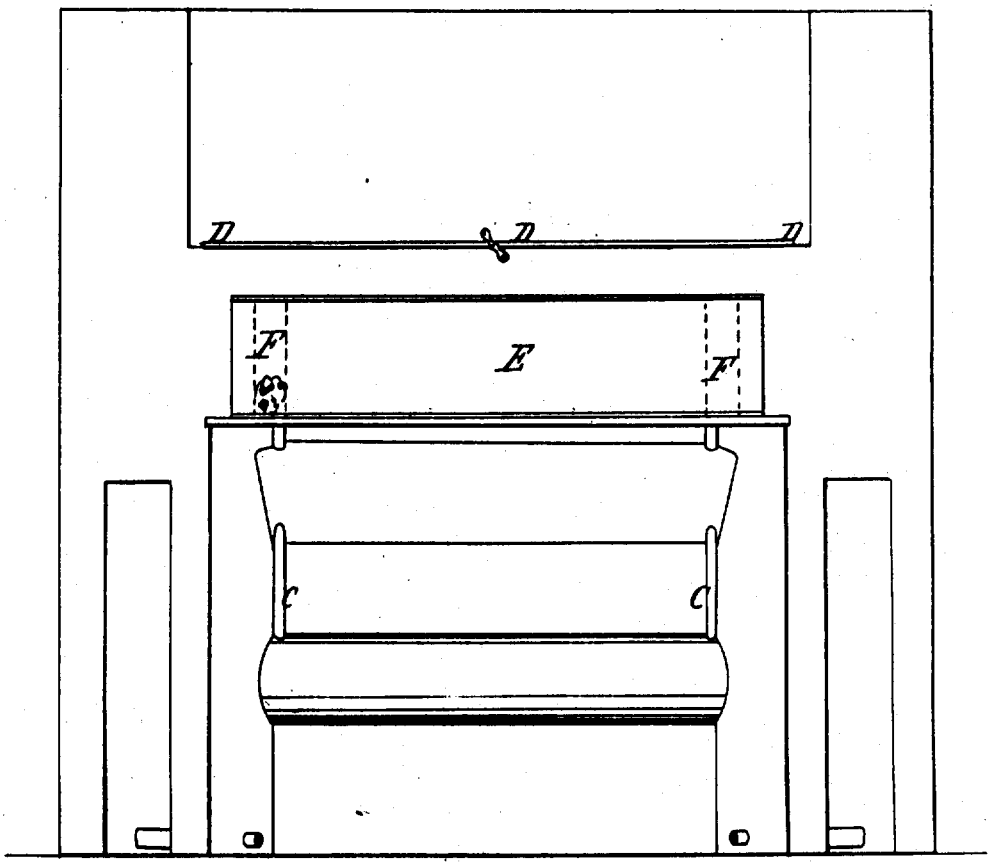
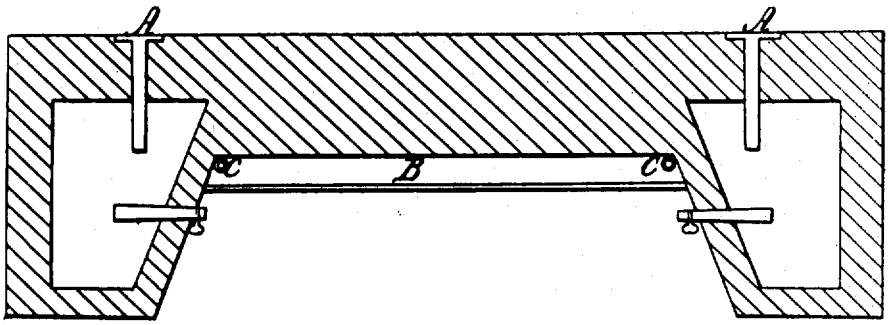
N. PETERS, PHOTO-LITHOGRAPHER, WASHINGTON, D. C.

9845X
Sheet 2-2 Sheets.
E. Smith.
Domestic Oven.
Patented Jul. 1, 1836.
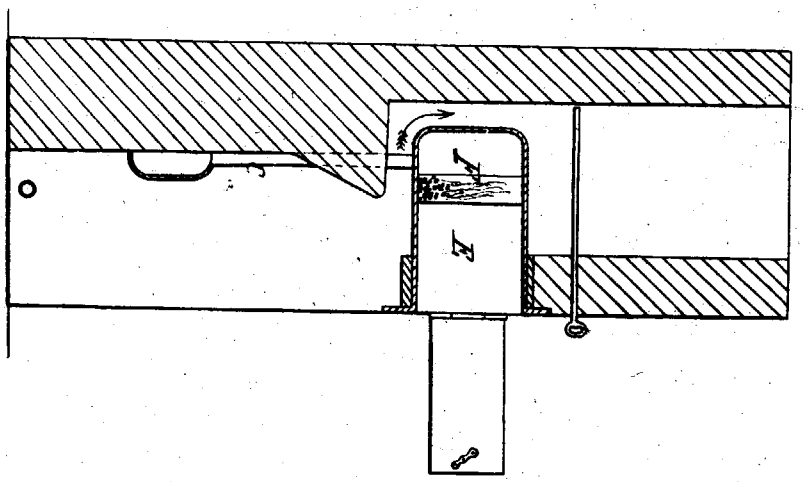
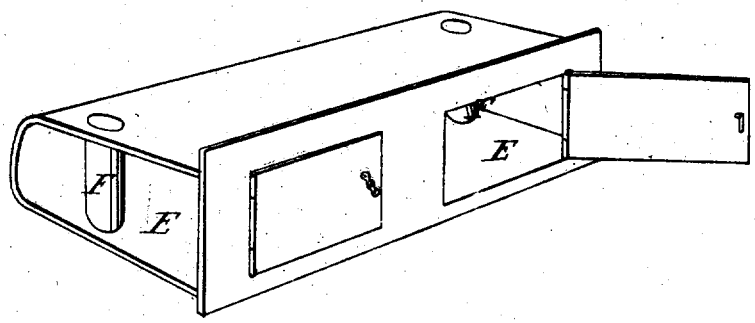

[illegible] Smith of [illegible] State of New York,

Letters Patent.

The schedule referred to in these Letters Patent and making
part of these same containing a description in the words of the
said [illegible] Smith himself of his improvement in building
and making chimneys [illegible]

To all whom these presents shall come
Be it known that I [illegible] Smith of the town of Ithaca in
the County of Tompkins in the State of New York have inven-
ted a new and useful improvement in the building and making
of Chimneys and flues for houses, and that the following is a full
and exact description thereof.

Flues made of cast iron or some other metal, are placed
between the joists and floors where the hearth to the fire place
is placed [illegible] the jambs to the chimney are made
hollow [illegible] a place on the outside of the
house [illegible] passage between
the floor and joists [illegible] hollow jambs of the
fire place in which the flues are placed serving to create
a [illegible] the fire place by means of the flues,
[illegible] the fire place
[illegible] the admis-
sion of [illegible] through the [illegible] of the house,
[illegible] of the chimney [illegible] of the flue
[illegible] jambs of the chimney
[illegible] hollow [illegible] feet or more ac-
cording [illegible] fire place. In the back of the fire
place [illegible] the fire place
[illegible] four inches in width
[illegible] fire place is made.

9845X

3 entirely of brick or where a cast iron back is used, the cast iron
is fluted in the front, with the rear, so as to form a hollow in the
back side of it, on each side of the fire place upon this hollow
space and connected therewith is placed two pipes or flues made
of cast or sheet iron which are placed perpendicularly, and
extend up to the mantle bar, and above a damper placed
there, two or three inches above the mantle bar in the throat
of the chimney is placed a sheet or cast iron damper on the
under side of which is placed a small rod by which it is moved
so as to govern the draught of the chimney The oven is as follows A box made of sheet iron, or boiler iron or cast iron
square in front and the back part rounding, made nearly
the width of the fire place from six to twelve inches in
depth and from one to two feet from the front to the back
part having one or more doors in front, in the back part of which
is placed one or more flues made of cast or sheet iron
either square or round extending from the top to the bottom
of the oven and are from six to eight inches in calibre and
and serve to conduct the heat from the fire place through
the oven. — When there is no fire used in the fire place,
a small grating made of iron can be placed in the bottom
of the flues, upon which fuel can be placed to heat the
oven. [illegible] In case fire is kindled in the fire place an
ordinary grate made of iron can be hooked into eye plates
in [illegible] jambs of the fire place, and brought near the
bottom of the oven, by which many ordinary cooking
of the cook can be done about the fire place and bak-
ing done in the oven at the same time Upon the front part of the oven is placed two handles
to move the oven back out of the [illegible] chimney, the
[illegible] [illegible] [illegible] [illegible] the fire place, in
the chimney between [illegible] [illegible] chimney piece The perpendicular flues in the fire place above specified are brought
up to the under side of the oven, and serve to conduct the hot air from
the fire to the bottom of the oven, the heat is introduced into the
oven by means of small holes through the bottom part of the oven
directly over the mouth of the perpendicular flues.

In the perpendicular flues near the top of each is placed a
damper made of sheet or cast iron which is governed by an iron rod
and serves to regulate the quantity of heat introduced into the oven
Between the back of the chimney and the back part of the oven
there is a space left from two to four inches. Between the bot
tom of the oven, and the back of the fire place, ascending the
hearth is left a space from two to four inches which forms
the throat of the chimney, over the top of the oven the
whole width of the oven is placed a damper of cast or sheet
iron which is connected to a rod extending to the front
of the chimney by which it is governed and may be thrown
back to the back part of the chimney, or pulled forward so
as to regulate the quantity of heat applied to the oven when
used. What I claim as my own invention and not
previously known in the above described machine, the appli
cation to the fire place and chimney of the oven and hot
air flues as above specified.

The letting in from the perpendicular tubes of the hot air into
the oven, — This invention or improvement can be
applied to ordinary chimneys as well as any new chimney to be
built. Dated March 30th 1836.

Witnesses
Frederick R. Stanley
Saml. Crittenden Jr.

Elihu Smith

[illegible]

1080 [illegible]

Drawing made